US006568253B1

(12) United States Patent

Kubo et al.

(10) Patent No.: US 6,568,253 B1

(45) Date of Patent: May 27, 2003

(54) STRUCTURE FOR MOUNTING ANGLE SENSOR OF MULTICYLINDER ENGINE IN MOTORCYCLE

(75) Inventors: Katsuhiro Kubo, Saitama (JP); Shinichi Nakano, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/395,156

(22) Filed: Sep. 14, 1999

(30) Foreign Application Priority Data

Sep. 14, 1998 (JP) .......................................... 10-260499

(51) Int. Cl.[7] .................................................. G01L 3/26

(52) U.S. Cl. ........................................................ 73/116

(58) Field of Search ......................... 73/116, 117, 118.1

(56) References Cited

U.S. PATENT DOCUMENTS 4,632,073 A * 12/1986 Futakuchi ................ 123/90.27
5,778,849 A * 7/1998 Regueiro .................... 123/254
5,979,413 A * 11/1999 Ohnuma et al. .............. 73/116

FOREIGN PATENT DOCUMENTS

JP 57-12302 * 1/1982 ............ G01B/7/30
JP B2-63-26267 5/1988

* cited by examiner

*Primary Examiner*—Eric S. McCall
*Assistant Examiner*—Maurice Stevens
(74) *Attorney, Agent, or Firm*—Birch, Stewart, Kolasch & Kolasch, LLP

(57) ABSTRACT

In a fuel injection type multicylinder engine, both the mounting of a camshaft angle sensor, which is operable in response to angular movement of a valve driving camshaft to detect a timing of injection of fuel injected from a fuel injection valve, on the engine and maintenance of the resulting engine are improved. A camshaft angle sensor S is operable in response to an angular movement of an exhaust-side valve driving camshaft and is mounted on the engine E at one side surface exposed from the lower portion of a frame F. Mounting of a cam pulsar of the angle sensor S from the side of the frame F and the maintenance is possible without being obstructed by the frame F.

8 Claims, 5 Drawing Sheets

STRUCTURE FOR MOUNTING ANGLE SENSOR OF MULTICYLINDER ENGINE IN MOTORCYCLE

BACKGROUND OF THE INVENTION

1. Field of the Invention

This invention relates to a structure for mounting an angle sensor for detecting a fuel injection timing in a fuel-injection-type multicylinder engine mounted on a motorcycle.

2. Description of Background Art

The concept is currently known in which an angle sensor is supported by a valve driving camshaft of the multicylinder engine (see Japanese Patent Publication No. Sho 63-26267).

SUMMARY AND OBJECTS OF THE INVENTION

Generally, assuming that a fuel-injection-type engine is carried on a motorcycle, and an angle sensor for detecting a fuel injection timing of the engine is mounted on a valve driving camshaft, the following are required:

The angle sensor would operate accurately all the time.

It would be easy to mount the angle sensor on the engine with precision.

Easy maintenance of the angle sensor would be possible after mounting of the angle sensor on the engine.

The angle sensor can be seen well from outside.

With the angle sensor mounted on the engine, it would be unnecessary to make any structural design change over any existing elements such as the frame.

The angle sensor would not interfere with any obstruction.

The angle sensor would be kept from being smeared with rain, splashes, dirt, etc. With the angle sensor mounted on the engine, any projection would not appear on the engine.

It is therefore an object of this invention to provide a novel structure for mounting an angle sensor of a multicylinder engine in a motorcycle in such a manner that as many of the above-itemized requirements are fulfilled as possible.

In order to attain the above-mentioned object, according to the present invention, there is provided a structure for mounting an angle sensor of a multicylinder engine in a motorcycle in which the multicylinder engine is horizontally suspended on a frame with one side surface opening to the outside as viewed in a side elevation, wherein the engine has on one transverse end of the frame a timing transmission chamber in which a timing transmission mechanism for transmitting rotation of a crankshaft to a valve driving camshaft is accommodated. An opening surface is covered with a timing transmission chamber cover which is fixed to one end of the valve driving camshaft. A pulsar rotor of the angle sensor is supported by a driven gear of the timing transmission mechanism and, on the other hand, a cam pulsar of the angle sensor is supported by the timing transmission chamber cover in confronting relation to the pulsar rotor and is exposed to outside of the frame as viewed in side elevation. With this arrangement, mounting of the angle sensor on the engine and maintenance of the mounted angle sensor can be facilitated without either making a structural design change to the frame or affecting the mounting of other elements on the frame and their layout.

Also in order to attain the above-mentioned object, according to the present invention, there is provided a structure wherein the multicylinder engine is a double overhead camshaft (DOHC) type having a cylinder head on which an intake-side valve driving camshaft and an exhaust-side valve camshaft are disposed rearwardly and forwardly, respectively, of the frame, and wherein the pulsar rotor of the angle sensor is fixed to the driven gear of the timing transmission mechanism, which gear is fixed to one end of the exhaust-side valve driving camshaft and, on the other hand, the cam pulsar of the angle sensor, which pulsar confronts the driven gear, is fixed to the timing transmission chamber cover and projects from the frame as viewed in a side elevation. With this claimed feature, in addition to the attainment of the same results that of the present invention, it is possible to mount the angle sensor on the exhaust-side valve camshaft without changing the existing position of the engine.

Also in order to attain the above-mentioned object, according to the present invention, there is provided an angle sensor mounting structure, wherein the cam pulsar of the angle sensor is disposed within a projected plane of the engine as viewed in a side elevation and inwardly of the frame as viewed in plan. With the present invention, it is possible to mount the angle sensor on the exhaust-side valve camshaft without changing the existing position of the engine.

Still also in order to attain the above-mentioned object, according to the present invention, wherein the cam pulsar of the angle sensor has a pulsar body fixed to a flattered pulsar cover, the pulsar body, being retracted into the timing transmission chamber via an attaching opening aperture of the timing transmission chamber cover and the pulsar cover being attached to an exterior surface of the timing transmission chamber cover. With this feature, the angle sensor can be mounted on the engine in such a manner that no projection would appear on the engine or that the entire engine would be increased in size or have it's appearance impaired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode of the invention will now be described based on an embodiment shown in the accompanying drawings. In the following description of the embodiment, “front and rear”, “right and left” and “upper and lower” are terms concerning directions with respect to the direction in which a motorcycle moves forward.

Figure 1:
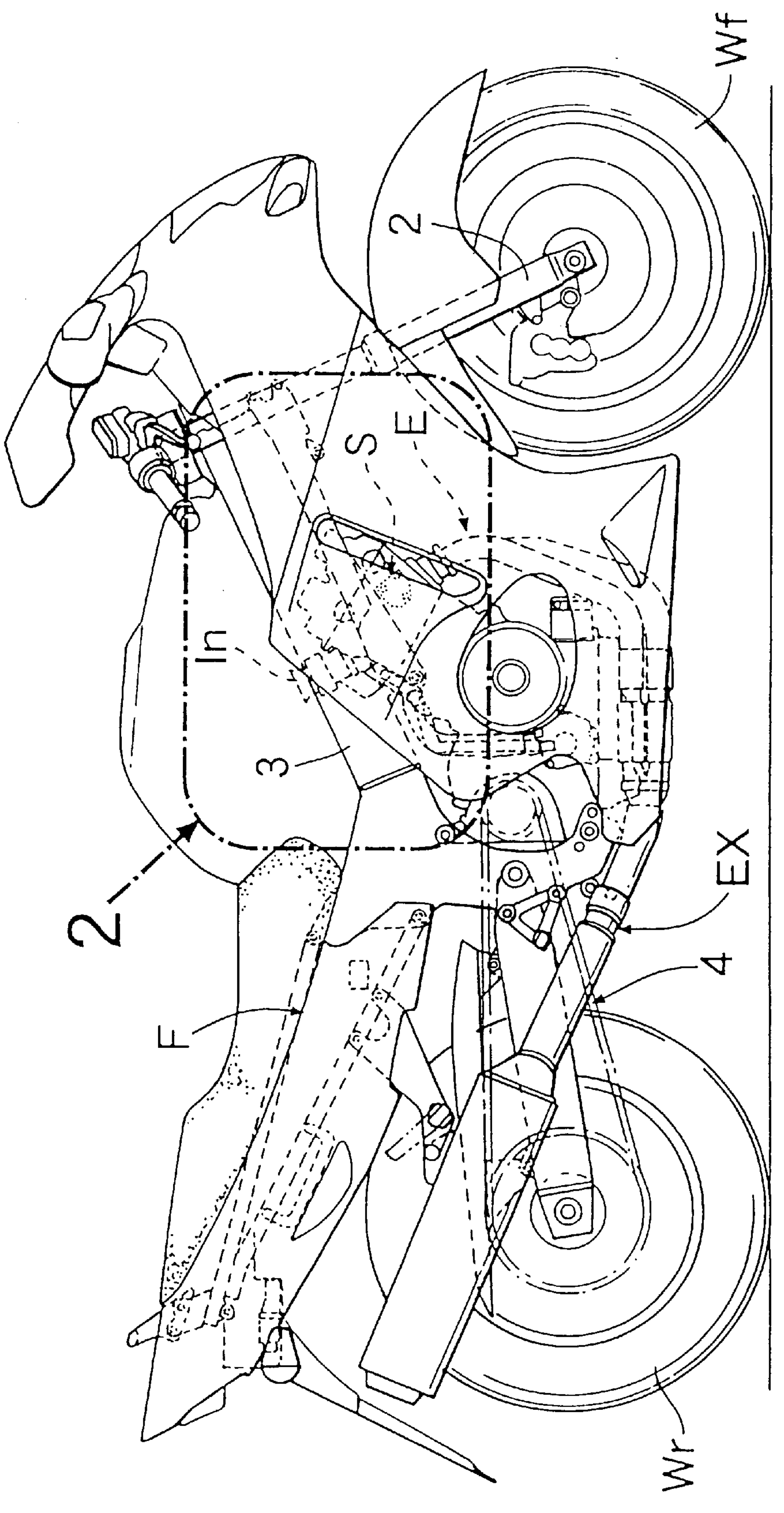
FIG. 1 is a side view of a motorcycle carrying a multicylinder engine E on which an angle sensor is mounted.
Figure 2:
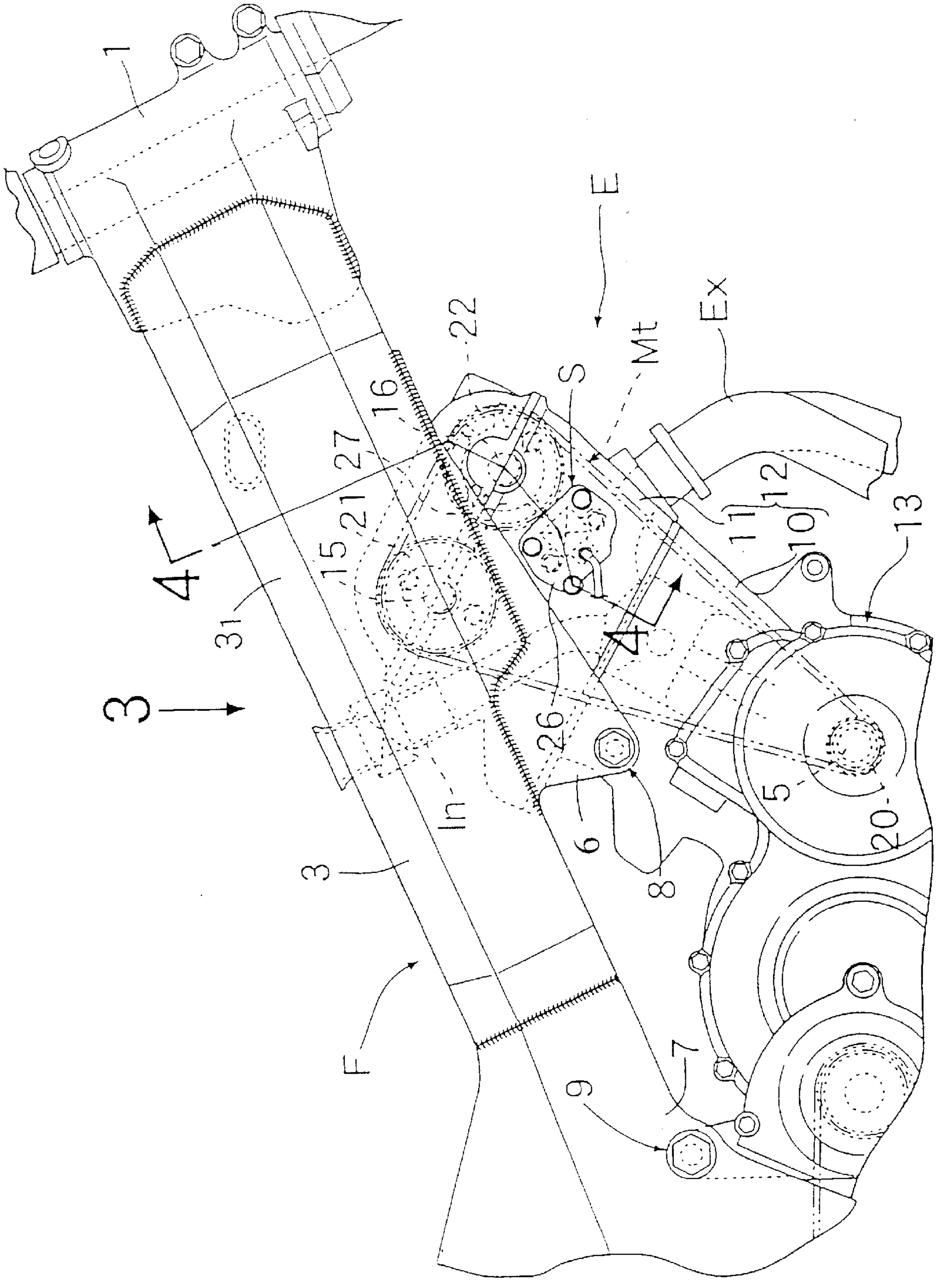
FIG. 2 is an enlarged side view of a portion of FIG. 1 encircled by a dash-and-dot line as viewed in the direction indicated by arrow 2, with a cowling omitted.

In FIGS. 1 and 2, a front wheel Wf is steerably supported on a head pipe 1 at the front end of a frame F via a front fork 2, and on the other hand, a rear wheel Wr is supported on a rear portion of the frame F via a rear bumper. An engine E is suspended between the front and real wheels Wf, Wr at an intermediate portion of the frame F. An output shaft of the engine E is operatively connected with the rear wheel Wr via a chain transmission mechanism 4.

Figure 3:
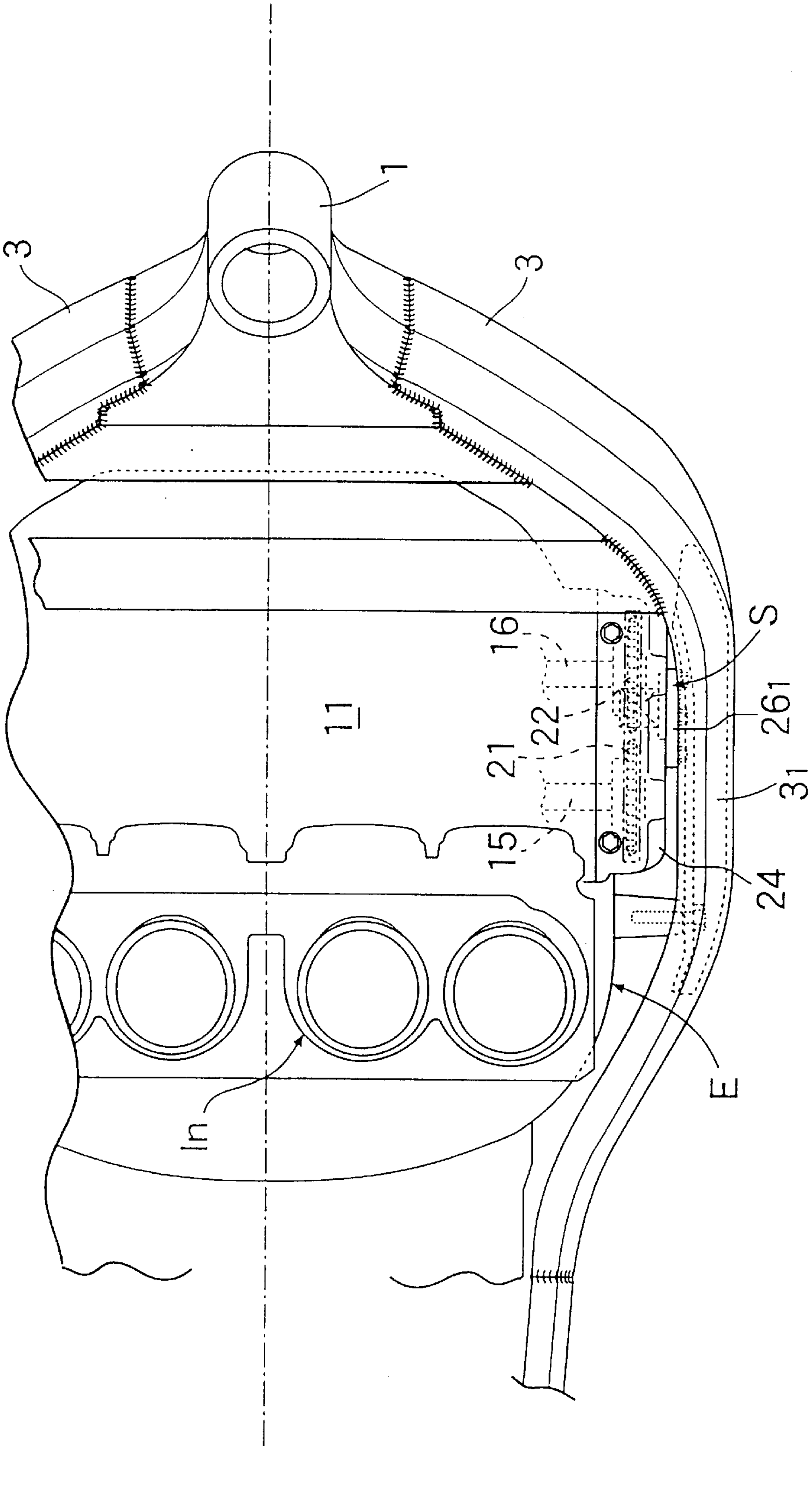
FIG. 3 is a fragmentary plan view, with parts omitted, of a portion of FIG. 2 as viewed in the direction indicated by arrow 3.

In FIGS. 1 through 3, the engine E is a double overhead-camshaft (DOHC) type series-multicylinder (four-cylinder) four-cycle gasoline-type engine. The engine E is disposed transversely of the frame F, that is, a crankshaft 5 is disposed perpendicularly to a longitudinal center line of the frame F, and front and rear portions of the engine E are each suspended between engine hangers 6, 7 of main frames 3 of the frame F via mount devices 8, 9 including bolts and nuts.

As is apparent from FIGS. 2 and 3, the engine E is provided with an engine block portion 12 in the form of a cylinder head 11 connected to a deck surface of a cylinder block 10 via a gasket, and a transmission housing communicating with a lower part of the engine block portion 12. The engine block portion 12 assumes a forwardly inclined posture slanting with respect to the transmission housing, which extends substantially horizontally. The upper surface of the cylinder head 11 is covered with a head cover 14 via packing. An exhaust system Ex is connected to an exhaust port opening to the front surface of the cylinder head 11, and on the other hand, an intake system In is connected to an intake port opening to the rear surface of the cylinder head 11.

In the DOHC-type series-four-cylinder engine E horizontally supported by the frame F, the engine block portion 12 extends transversely of the frame F, and four cylinders are arranged in series along the transverse engine block portion 12.

As shown in FIGS. 2 and 3, the left and right main frames 3 rearwardly extending and slanting downwardly from the head pipe 1 have portions confronting the left and right side surfaces of the engine E and outwardly convexly curved around the left and right side surfaces of the engine E.

As is apparent from FIG. 2, an exhaust-side valve driving camshaft 16 and an intake-side valve driving camshaft 15 are disposed forwardly and rearwardly of the head of the engine block portion 12, i.e. the upper portion of the cylinder head 11 and are parallel thereto. The engine block portion 12 has on one end along the crankshaft 5, i.e., a right side end of the motorcycle, a timing transmission chamber 18 spanning between the cylinder block 10 and the end surface of the cylinder head 11. In the timing transmission chamber 18, a timing transmission mechanism Mt operatively connects the crankshaft 5 with intake-and exhaust-side valve driving camshafts 15, 16. The timing transmission mechanism Mt comprises a driving sprocket 20 in the form of a driving gear fixed to one end of the crankshaft 5, driven sprockets 21, 22 in the form of two driven gears respectively fixed to ends of the intake and exhaust-side valve driving camshafts 15, 16, and a transmission chain 23 in the form of an endless transmission belt wound around the driving sprocket 20 and the two driven sprockets 21, 22 so that rotation of the crankshaft 5 is transmitted to the intake- and exhaust-side valve driving camshafts 15, 16 via the timing transmission mechanism Mt at a ratio of rotation of 1/2.

The timing transmission chamber 18 opens at a portion confronting the cylinder head 11 to the outside, and the open portion is covered with a timing transmission cover 24 fixed to the end surface of the cylinder head 11 by a fastener such as a threaded bolt.

As shown in FIG. 2, a lower half of the engine block portion 12 is located at a level lower than the main frames 3 of the frame F and is exposed from the main frames 3 as viewed in a side elevation of the frames F. Also the lower half of the timing transmission chamber cover 24 is located at a lower level than the main frames 3 so as to be directly seen from the side of the frame F.

Figure 4:
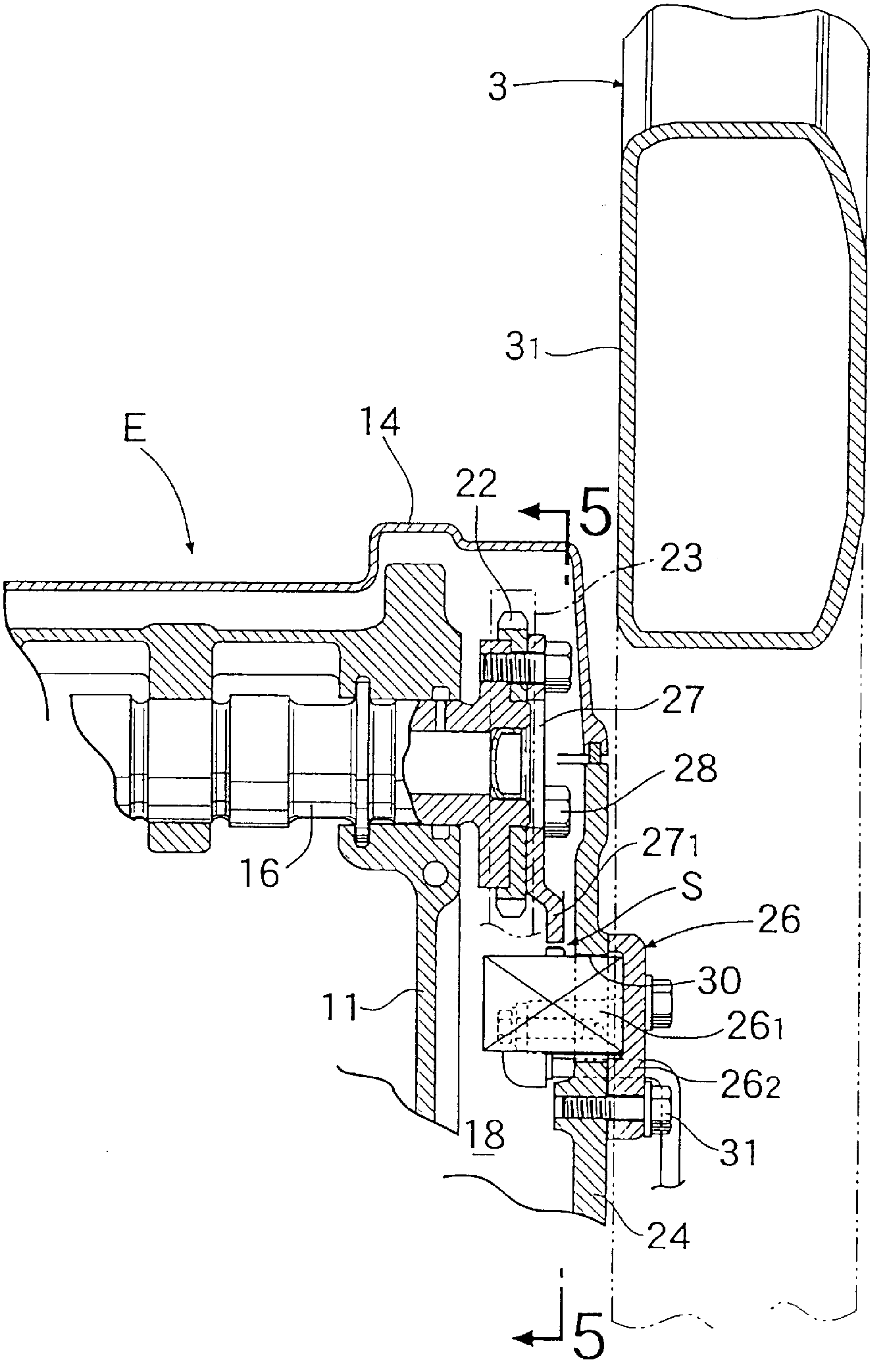
FIG. 4 is an enlarged cross-sectional view taken along line 4—4 of FIG. 2.
Figure 5:
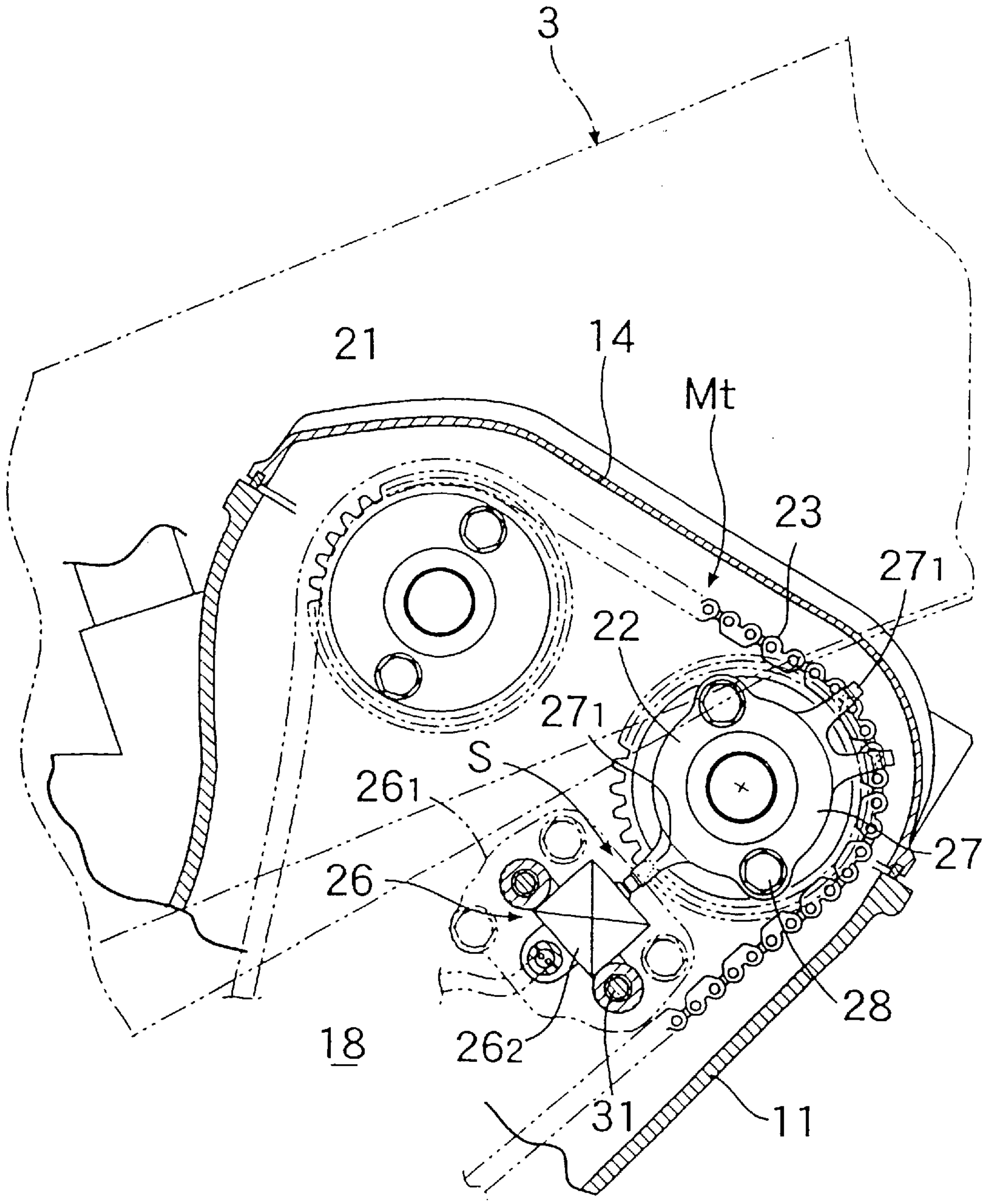
FIG. 5 is a cross-sectional view taken along line 5—5 of FIG. 4.

A variable-valve-camshaft angle sensor S, which serves to detect a fuel injection timing of a fuel injection valve of the engine E, is mounted on the exhaust-side valve driving camshaft 16. The angle sensor S is composed of, as usual, a cam pulsar 26 equipped with a pickup coil, and a pulsar rotor 27 cooperating with the cam pulsar 26. As is clearly shown in FIG. 4, in the timing transmission chamber 18, the pulsar rotor 27 is detachably fixed to an outer end surface of the driven sprocket 22, which is fixed to the end of the exhaust-side valve driving camshaft 16, by a plurality of threaded bolts 28. The pulsar rotor 27 has a recessed outer end surface so that the heads of the threaded bolts 28 are received in such a recess. Downwardly of the pulsar rotor 27, the cam pulsar 26 is attached to the timing transmission chamber cover 24. The cam pulsar 26 has a pulsar body $\mathbf{26_2}$ fixed to the inner surface of a pulsar cover $\mathbf{26_1}$. The pulsar body $\mathbf{26_2}$ is retracted into the timing transmission chamber 18 through an attachment aperture 30 of the timing transmission chamber cover 24, and on the other hand, the pulsar cover $\mathbf{26_1}$ is fixed to the timing transmission chamber cover 24 by threaded bolts 31. A cord to be connected to the pulsar body $\mathbf{26_2}$ extends outwardly of the timing transmission chamber 18 through the pulsar cover $\mathbf{26_1}$. The pulsar body $\mathbf{26_2}$ is disposed adjacent to a claw $\mathbf{27_1}$ of the pulsar rotor 27 so that an angle of rotation of the exhaust-side valve driving camshaft 16 is detected as a pulse signal as the cam pulsar 26 and the pulsar rotor 27 cooperate.

Thus, since the cam pulsar 26, as shown in FIG. 2, is detachably attached to an external surface of the lower half exposed downwardly from the frame F and is located in a position seen from the side of the frame F, attachment and maintenance of the cam pulsar 26 are possible simply without removing the engine E from the frame F. Partly since the majority of the pulsar body $\mathbf{26_1}$ is retracted in the timing transmission chamber 18 and projects inwardly of the endless transmission chain 23 into the chain line, and partly since the flattened pulsar cover 27 only projects from the external surface of the timing transmission chamber cover 24, the cam pulsar 26 is kept from projecting to an outside to interfere with any other element even if it is attached to the timing transmission chamber cover 24.

As shown in FIG. 3, the pulsar cover $\mathbf{26_1}$ of the cam pulsar 26 is located between the engine E and the frame F and can be viewed in plan so that a mounted state of the cam pulsar 26 can be observed from either the upper side or the lower side of the motorcycle.

Advantageous results of the camshaft angle sensor mounting structure are itemized as follows:

(1) Partly because the cam pulsar 26 of the angle sensor S is disposed in a projected plane of the engine block portion 12 as viewed in a side elevation with respect to the frame F and partly because the cam pulsar 26 is mounted on the timing transmission chamber cover 24, which is exposed to the side of the frame F, at a lower position seen from the side of the frame F, mounting of the cam pulsar 26 on the engine E and then its maintenance can be achieved wth ease.

(2) Since the cam pulsar 26 of the angle sensor S is located in a sidewardly open position at the lower side of the main frames 3, it would be unnecessary to make any structural design change to the frame F, such as increasing the width of the main frames.

(3) Since the cam pulsar 26 of the angle sensor S is disposed in a projected plane of the engine E from its side and is disposed inwardly of the main frames 3, it would be possible to protect the cam pulsar 26 by the engine E and the frame F so that the cam pulsar 26 would not tend to be smeared with rain, splashes, and dirt, etc.

(4) Because the cam pulsar 26 can be seen either in side elevation or in plan, it would be possible to observe a mounted state with ease.

(5) Partly since the pulsar body $26_2$, which is a main part of the cam pulsar 26, is restricted in the timing transmission chamber 36, and partly since the flattened pulsar cover $26_1$ of the cam pulsar 26 only bulges from the exterior surface of the engine E, the engine E would be free from increasing either in size or in number of projections due to the existence of the angle sensor S, thus preventing the engine E not only from being impaired in appearance but also from affecting both the mounting of other elements and their layout.

This invention should by no means be limited to the above-mentioned embodiment and various modifications may be suggested within the scope of the invention. For example, in the illustrated embodiment, this invention was applied to a series-four-cylinder engine. Alternatively, it of course may be applied to other types engines. Further, for the timing transmission mechanism, a belt transmission mechanism, a gear transmission mechanism or other transmission mechanism may be substituted for the main transmission mechanism.

As is mentioned above, according to the present invention, it is possible to facilitate mounting the angle sensor to the engine and maintenance of the mounted angle sensor. Because of mounting the angle sensor on the engine, it is unnecessary to make a structural design change to the frame without affecting either the mounting of other elements on the frame or layout of those elements.

Further, according to the present invention, it is possible to mount the angle sensor on the exhaust-side valve camshaft without changing the existing position of the engine.

Still further, according to the present invention, it is possible not only to protect the cam pulsar by the engine and frame but also to make the cam pulsar difficult to impair with rain, splashes, and dirt, etc.

Furthermore, according to the present invention, the angle sensor can be mounted on the engine in such a manner that no projection would appear on the engine or that the entire engine would be increased in size or have it's appearance impaired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for mounting an angle sensor on a side surface of a multicylinder engine of a motorcycle, wherein said multicylinder engine has a right side surface and a left side surface which confront and are horizontally attached to a left main frame and a right main frame extending rearwardly and slanting downwardly from a head pipe, and wherein said structure for mounting the angle sensor comprises:

a timing transmission chamber mounted on the engine, and extending along one end of a valve driving camshaft in a direction perpendicular to an axis of said valve driving camshaft;

a timing transmission mechanism for transmitting rotation of a crankshaft to said valve driving camshaft;

a timing transmission chamber cover for covering an opening in said timing transmission chamber, the timing transmission chamber cover being exposed in a direction perpendicular to the axis of the valve driving camshaft and to an outside of one of the frames;

a pulsar rotor of the angle sensor, said pulsar rotor being supported by a driven gear and being detachably fixed to said end of said valve driving camshaft of said timing transmission mechanism; and a cam pulsar of the angle sensor, said cam pulsar being disposed inside said timing transmission chamber and supported by said timing transmission chamber cover so as to face said pulsar rotor, and said cam pulsar being disposed lower than and inward from one of said main frames, so that in a mounted state, said cam pulsar can be observed from either an upper side or a lower side of the motorcycle.

2. The structure for mounting an angle sensor of a multicylinder engine in a motorcycle according to claim 1, wherein said multicylinder engine is a double overhead camshaft type having a cylinder head on which an intake-side valve driving camshaft and an exhaust-side valve driving camshaft are disposed rearwardly and forwardly, respectively, of the frames, and wherein said pulsar rotor of the angle sensor is fixed to said driven gear of said timing transmission mechanism, said driven gear being fixed to one end of said exhaust-side valve driving camshaft, and said cam pulsar of the angle sensor is fixed to said timing transmission chamber cover so as to project from the frames in a direction perpendicular to said valve driving camshaft.

3. The structure for mounting an angle sensor of a multicylinder engine in a motorcycle according to claim 1, wherein said cam pulsar of the angle sensor is disposed within the engine inwardly of the frame.

4. The structure for mounting an angle sensor of a multicylinder engine in a motorcycle according to claim 1, wherein said cam pulsar of said angle sensor includes a pulsar body fixed to a flattened pulsar cover, said pulsar body being retracted into said timing transmission chamber through an attaching opening aperture of said timing transmission chamber cover, said flattened pulsar cover being attached to an exterior surface of said timing transmission chamber cover.

5. A structure for mounting an angle sensor on a side surface of a multicylinder engine of a motorcycle, wherein said multicylinder engine has a right side surface and a left side surface which confront and are horizontally attached to a main frame extending rearwardly and slanting downwardly from a head pipe, and wherein said structure for mounting the angle sensor comprises:

a timing transmission chamber mounted on an engine, and extending along one end of a valve driving camshaft in a direction perpendicular to an axis thereof, said frame being offset relative to said timing transmission chamber for permitting direct access thereto;

a timing transmission mechanism for transmitting rotation of a crankshaft to said valve driving camshaft;

a timing transmission chamber cover for covering an opening in said timing transmission chamber, the timing transmission chamber cover being exposed in a direction perpendicular to the axis of the valve driving camshaft and to an outside of the frame;

a pulsar rotor of the angle sensor, said pulsar rotor being supported by a driven gear and being detachably fixed to said end of said valve driving camshaft of said timing transmission mechanism; and a cam pulsar of the angle sensor, said cam pulsar being disposed inside said timing transmission chamber and supported by said timing transmission chamber cover so as to face said pulsar rotor, and said cam pulsar being disposed lower than and inward from said main frame, so that in a mounted state, said cam pulsar can be observed from either an upper side or a lower side of the motorcycle.

6. The structure for mounting an angle sensor of a multicylinder engine in a motorcycle according to claim 5, wherein said multicylinder engine is a double overhead camshaft type having a cylinder head on which an intake-side valve driving camshaft and an exhaust-side valve driving camshaft are disposed rearwardly and forwardly, respectively, of the frame, and wherein said pulsar rotor of the angle sensor is fixed to said driven gear of said timing transmission mechanism, said driven gear being fixed to one end of said exhaust-side valve driving camshaft, and said cam pulsar of the angle sensor is fixed to said timing transmission chamber cover and projects from the frame.

7. The structure for mounting an angle sensor of a multicylinder engine in a motorcycle according to claim 5, wherein said cam pulsar of the angle sensor is disposed within the engine inwardly of the frame as viewed in plan.

8. The structure for mounting an angle sensor of a multicylinder engine in a motorcycle according to claim 5, wherein said cam pulsar of said angle sensor includes a pulsar body fixed to a flattened pulsar cover, said pulsar body being retracted into said timing transmission chamber through an attaching opening aperture of said timing transmission chamber cover, said flattened pulsar cover being attached to an exterior surface of said timing transmission chamber cover.

* * * * *